Feb. 26, 1957 L. H. PETER ET AL 2,783,418
METAL RECTIFIERS
Filed June 9, 1955
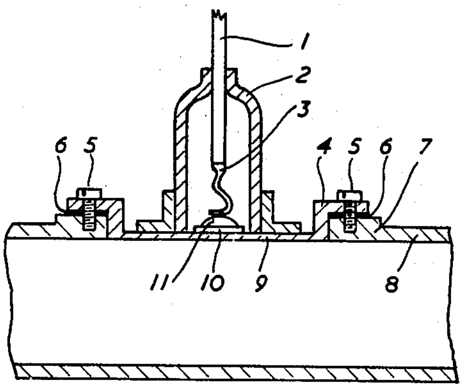
INVENTORS
LESLIE HURST PETER,
ARTHUR LANGRIDGE,
BRIAN JAMES GUMM,
BY Larson and Whitney
ATTORNEYS United States Patent Office 2,783,418

Patented Feb. 26, 1957

2,783,418

METAL RECTIFIERS

Leslie Hurst Peter, Arthur Langridge, and Brian James Gumm, King's Cross, London, England, assignors to Westinghouse Brake & Signal Company Limited, London, England Application June 9, 1955, Serial No. 514,174

Claims priority, application Great Britain June 22, 1954

2 Claims. (Cl. 317—234)

This invention relates to metal rectifiers and has for its object the provision of improved means for the dissipation of the heat generated in such rectifiers when in use, thus enabling them to be worked at higher current densities.

According to the invention, in a metal rectifier comprising a semi-conductive body having a first electrode on one surface of the body and a second electrode on the opposite surface, one of said electrodes is attached to or forms part of a cooling plate by which a coolant may be passed for the purpose of dissipating the heat generated by the rectifier when in use.

To enable the coolant to be brought in contact with the surface of said cooling plate, the cooling plate has been removably located in an aperture in the wall of a tube through which the coolant is allowed to flow.

Hence, the invention relates to metal rectifiers which have as a further object the provision of means for removing said rectifier, its electrodes, and the cooling plate as a unit from the cooling system without disturbing said cooling system should the rectifier fail and require replacement.

According to one method of manufacturing a metal rectifier embodying the invention a disc of semi-conductive material, such as germanium or silicon for example, suitable for the production of a P–N rectifying junction, is soldered to a cooling plate, which may be of nickel or nickel iron for example, and a rectifying junction is then formed on the other side of the disc to which a suitable electrical connection is made. The cooling plate is then inserted in an aperture in the wall of a hollow tube to which it is secured by suitable means, a gasket being provided around the joint between the cooling plate and the tube. The passing of a coolant through the tube on which may be mounted a number of such individual rectifiers, carries away the heat generated in the rectifier.

The invention is illustrated by way of example in the accompanying drawing the single figure of which shows, in somewhat diagrammatic form, a cross-sectional view of one form of rectifier assembly embodying the invention.

Referring to the drawing, in the rectifier assembly shown therein one surface of a disc 10 of semi-conductive material, such as germanium or silicon for example, is soldered to a cooling plate 9 of good heat conducting material and has a rectifying junction formed on the other surface. The rectifying junction may be formed in any suitable manner, such as by the diffusion of a suitable metal 11 applied to the surface of the semi-conductor, and an electrical connection made thereto by soldering one end of a wire connector 3, the other end of which is soldered to a terminal conductor 1. The cooling plate 9 thus forms one electrode of the rectifier whilst the metal 11 to which the connector 3 is soldered forms the other electrode. The assembly thus far described may be provided with a protective insulating casing 2 of any suitable form and material.

The cooling plate 9 is inserted in an aperture provided in the wall of a tube 8, around the periphery of which is an external boss 7 to which is secured, as by a number of screws 5, a gasket 6 being provided to prevent leakage of the coolant which is passed through the tube and which thus carries away the heat generated by the rectifier.

It will be evident that, with the assembly described above, the necessary second electrical connection may be made to flange 4 or to the tube 8 and the latter may be a common terminal for all of a number of such assemblies mounted on the same tube. If, however, it is necessary to connect the rectifier in an electrical circuit wherein such a parallel connection is not required, then either the cooling plate of the assembly must be insulated from the tube or each section of the tube itself must be insulated from adjacent sections, as by short lengths of rubber tube, for example. In such cases it will also be necessary either to use an electrically non-conductive coolant or to insulate that portion of the cooling plate over which the coolant flows without unduly impairing the transfer of heat between the two or, for example, by forming a thin layer of aluminium oxide on the under surface of the cooling plate. Alternating, the tube itself may be of electrically insulating material.

Having thus described our invention what we claim is:

1. An alternating current rectifier comprising a body of semi-conductive material, a cooling plate affixed to said body, a tube for conveying coolant and having an aperture in its wall, said aperture being closed by said cooling plate, and means for securing said cooling plate to said tube, said means permitting said cooling plate to be detached from said tube.

2. An alternating current rectifier comprising a body of semi-conductive material, a cooling plate affixed to said body, said cooling plate forming part of a protective casing for said body, a tube for conveying coolant and having an aperture in its wall, said aperture being closed by said cooling plate, and means for securing said cooling plate to said tube, said means permitting said cooling plate to be detached from said tube.

References Cited in the file of this patent

UNITED STATES PATENTS

| | | |
|---|---|---|
| 2,162,740 | Mirick | June 20, 1939 |
| 2,725,505 | Webster et al. | Nov. 29, 1955 |

FOREIGN PATENTS

| | | |
|---|---|---|
| 1,081,675 | France | June 9, 1954 |